United States Patent
Slobodenyuk et al.

(10) Patent No.: US 11,941,170 B2
(45) Date of Patent: Mar. 26, 2024

(54) METHOD AND SYSTEM FOR EYE-TRACKER CALIBRATION

(71) Applicant: Tobii AB, Danderyd (SE)

(72) Inventors: Sergey Slobodenyuk, Danderyd (SE); Mikkel Rasmussen, Danderyd (SE); Andreas Jansson, Danderyd (SE); Thomas Gaudy, Danderyd (SE); Evgeniia Farkhutdinova, Danderyd (SE); Jonas Högström, Danderyd (SE); Richard Andersson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/697,442

(22) Filed: Mar. 17, 2022

(65) Prior Publication Data

US 2022/0317768 A1 Oct. 6, 2022

(30) Foreign Application Priority Data

Mar. 31, 2021 (SE) .................................... 2150401-4

(51) Int. Cl.
  *G06F 3/01* (2006.01)
  *G06F 3/04845* (2022.01)
  *G06V 10/141* (2022.01)
  *G06V 40/19* (2022.01)

(52) U.S. Cl.
  CPC .......... *G06F 3/013* (2013.01); *G06F 3/04845* (2013.01); *G06V 10/141* (2022.01); *G06V 40/19* (2022.01)

(58) Field of Classification Search
  None
  See application file for complete search history.

(56) References Cited

U.S. PATENT DOCUMENTS

| 9,936,195 B2 | 4/2018 | Horesh | |
|---|---|---|---|
| 2011/0254865 A1* | 10/2011 | Yee | G06F 3/04886 345/661 |
| 2014/0226131 A1* | 8/2014 | Lopez | G06F 21/31 351/210 |

(Continued)

OTHER PUBLICATIONS

Swedish Search Report in respect to Appl. Nr. 2150401-4 (dated Dec. 9, 2021).

(Continued)

*Primary Examiner* — Patrick N Edouard
*Assistant Examiner* — Peijie Shen
(74) *Attorney, Agent, or Firm* — Christopher Ignatius Moylan

(57) ABSTRACT

The invention is related to a method and system for calibrating an eye tracking device configured to track a gaze point of a user on a display The method comprises: presenting a video on the display to a user, the video having a start size and a start position; tracking the gaze of the user, using an image sensor of the eye tracking device; and sequentially completing, for at least one calibration position, the steps of: resizing the video to a calibration size, wherein the calibration size is smaller than the start size, and translating the video to a calibration position; recording calibration data, using the eye tracking device, for the user viewing the video in the calibration position; and resizing the video to a second size that is greater than the start size.

16 Claims, 4 Drawing Sheets

(56) References Cited

U.S. PATENT DOCUMENTS

| | | | |
|---|---|---|---|
| 2014/0320397 A1* | 10/2014 | Hennessey | G06F 3/013 |
| | | | 345/156 |
| 2014/0354539 A1* | 12/2014 | Skogo | G06F 3/013 |
| | | | 345/156 |
| 2015/0085251 A1 | 3/2015 | Larsen | |
| 2015/0316981 A1* | 11/2015 | Sellen | G06V 40/193 |
| | | | 345/156 |
| 2015/0331485 A1* | 11/2015 | Wilairat | G02B 27/0172 |
| | | | 345/156 |
| 2016/0093136 A1* | 3/2016 | Lyons | G07F 17/3237 |
| | | | 463/31 |
| 2016/0109945 A1* | 4/2016 | Kempinski | G06F 3/013 |
| | | | 348/78 |
| 2017/0344111 A1* | 11/2017 | Kim | G06F 3/013 |
| 2017/0364149 A1 | 12/2017 | Lu et al. | |
| 2017/0364150 A1* | 12/2017 | Lovtjärn | G06F 3/017 |
| 2018/0004289 A1* | 1/2018 | Wilson | G06F 1/163 |
| 2019/0333480 A1* | 10/2019 | Lang | G06F 3/011 |
| 2020/0134295 A1* | 4/2020 | el Kaliouby | G06V 10/82 |
| 2021/0090225 A1* | 3/2021 | Jin | G06F 3/013 |

OTHER PUBLICATIONS

Swedish Search Report and Written Opinion of Swedish App. No. 2150401-4, dated Dec. 9, 2021.

\* cited by examiner

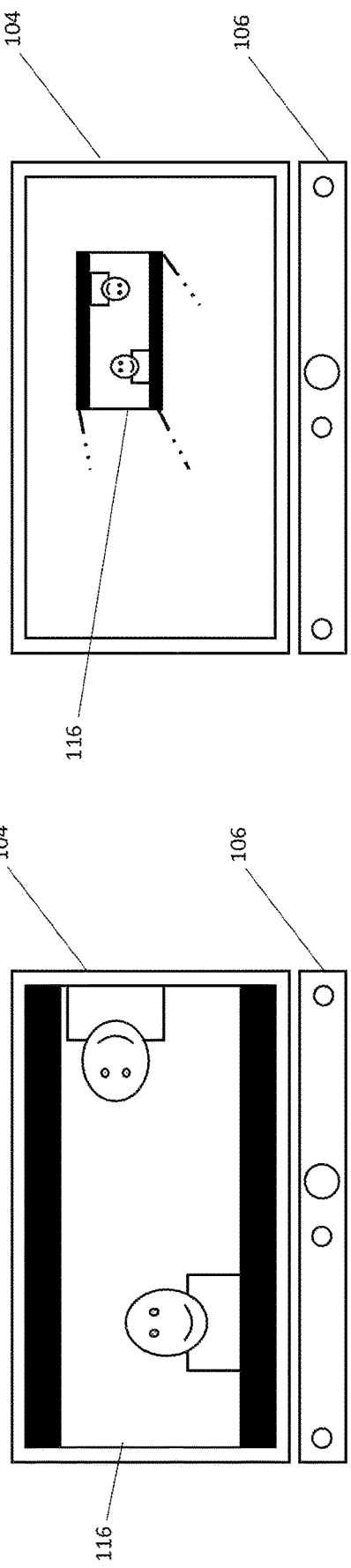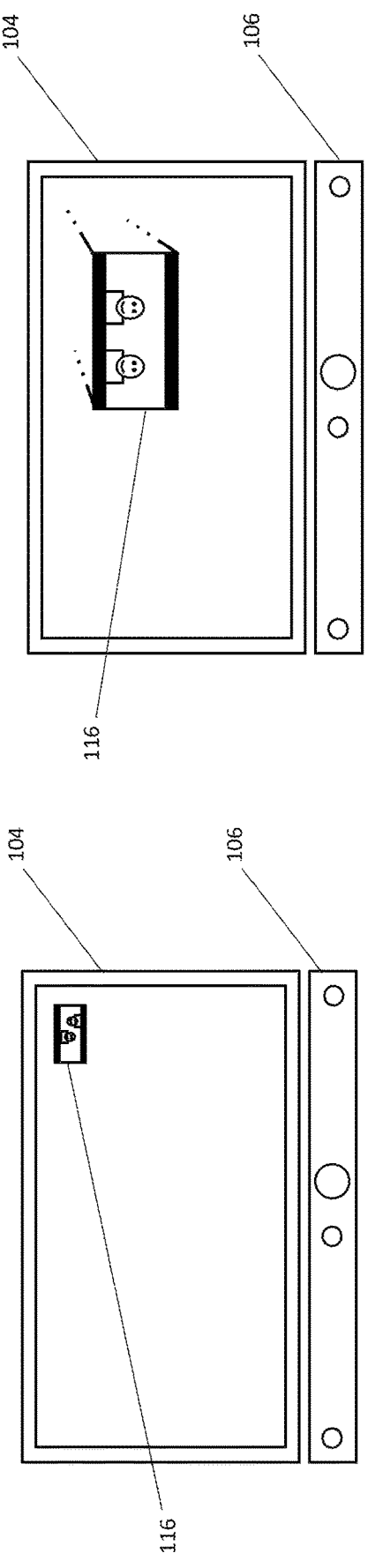

METHOD AND SYSTEM FOR EYE-TRACKER CALIBRATION

CROSS-REFERENCES TO RELATED APPLICATIONS

This application claims priority to Swedish Application No. 2150401-4, filed Mar. 31, 2021; the content of which is hereby incorporated by reference.

TECHNICAL FIELD

The present invention relates to a method for calibrating an eye tracking device, and to an eye tracking system.

BACKGROUND ART

In order to perform eye tracking operations or research, it is often at first necessary to perform a calibration process with a user. These calibration processes are executed by asking the user to dwell on a particular position relative to an image sensor of the eye tracking system. One or more calibration points or calibration positions can be used to generate a gaze estimation function that is able to transform an image of the eyes, as seen by the image sensor, to a gaze direction, and therefore to a position on a display. In general, a larger number of calibration points will yield a gaze estimation function with better accuracy in gaze estimation across the field of view of the user. In some examples, the calibration operates by using the gaze estimation model to estimate a number of different parameters in an eye model of the user. The eye model can then be used to determine the gaze direction during further operation of the gaze tracking device.

However, this form of calibration only works on a willing and understanding participant, as it is necessary to know that the user is looking at each calibration point. If the user is looking at a different point, the calibration accuracy will suffer as a result. This is of a particular issue with children and animals, such as non-human primates, as it may not be possible to effectively communicate the calibration process with them or they may be uncooperative. There may also be issues with calibration where the user lacks understanding for other reasons, such as learning difficulties, or where it is desirable to calibrate an eye tracking device without the user being specifically aware that a calibration process is being carried out.

Attempted solutions to these problems have included the use of static images at each designated calibration point, which are designed to capture the attention of the user without specific instruction. Similarly, video clips can also be played at the designated calibration point, on the basis that the user is likely to view them and to have their attention drawn to them.

Game-like calibration methods have also been proposed. Such methods utilise a reward system. For example, a balloon may be shown at each calibration point and the user is rewarded for looking at the balloon during calibration by this triggering an animation of the balloon popping. However, this does again rely on some level of understanding of the user.

Another option is the use of physical calibration methods. For example, a toy may be held in a calibration target position in order to draw the attention of the user. This is of course open to inaccuracies in both the positioning of the toy in relation to the desired calibration point, and also to the fact that the toy is likely to be larger than the calibration target, adding inaccuracy.

It is therefore desirable to provide a calibration process that overcomes or ameliorates the above issues.

STATEMENTS OF INVENTION

According to a first aspect, there is provided a method for calibrating an eye tracking device configured to track a gaze point of a user on a display, the method comprising:
    presenting a video on the display to a user, the video having a start size and a start position;
    tracking the gaze of the user, using an image sensor of the eye tracking device;
    sequentially completing, for at least one calibration position, the steps of:
        (a) resizing the video to a calibration size, wherein the calibration size is smaller than the start size, and translating the video to a calibration position;
        (b) recording calibration data, using the eye tracking device, for the user viewing the video in the calibration position;
        (c) resizing the video to a second size that is greater than the start size.

The invention therefore allows the gaze of a user to be calibrated by an eye tracking device without the specific cooperation or need for understanding of instructions by the user. Attention of the user is grabbed by the video due to its content and retained due to the seamless switching from video display to calibration process.

The method may comprise a plurality of calibration positions, where steps (a) to (c) are repeated for each calibration position. The use of multiple calibration positions ensures that the calibration process provides good accuracy over a whole of the display.

The second size may be the same as the start size.

The method may further comprise, in step (c), translating the video away from the calibration position. The translation may be in the direction of the start position. Optionally, the translation may be back to the start position.

The start size may be a size that fills or substantially fills the display.

For example, the start size of the video may fill 100% of the display, or may fill more than 90% of the display, or may fill more than 80% of the display. Any area of the display not filled with the video may be empty of anything that would provide a distraction to the user. For example, parts of the display not filled with video may be left blank, black, filled in a single colour, and/or non-moving.

The start position may be central on the display.

Resizing and translation of the video may be performed simultaneously. By resizing and translating the video simultaneously, the attention of the user may be better retained on the video during the calibration process.

Alternatively, resizing may follow translation or translation may follow resizing.

The video may continue playing seamlessly, i.e. without breaks, throughout the calibration of one calibration point or may continue seamlessly throughout the entire calibration process. This means that the content of the video remains the same, e.g. a single cartoon is played, or an episode of a particular programme is played. Of course, the video may include scene switches or other usual features of videos during the process, but it is preferable to avoid stoppages or lengthy breaks in the display of the video content. For example, it may be desirable to prevent any abrupt stoppages of the video and to prevent a video of a different genre or type replacing another video during the process.

By continuing the video seamlessly throughout the entire calibration process, the attention of the user may be better retained. Changing the content of the video part way through the calibration process may risk losing the attention of the user.

Alternatively, the video may be changed part-way through the calibration process. Although this may interrupt the ongoing attention of the user, utilising new content in the video may renew the user's interest in the video and therefore may assist with calibration of multiple calibration points. In this case, it may still be desirable to provide a consistent stream of video content for each calibration point.

It may be desirable to avoid changing the content of the video whilst the video has the attention of the user. Therefore, changing of the video may only occur when it has been determined, automatically or manually, that the attention of the user is not on the video.

The content of the video may be forced to change if it is determined that the attention of the user has been lost. By changing the content, attention of the user may be re-captured. Detection of attention loss may be by detecting the general gaze direction of the user, e.g. by detecting that they have turned their head away from the display or are clearly looking to the side of the display, and may be automatic or determined by an operator of the system.

The video may be accompanied by audio content. The audio content may be correlated to the video, e.g. the audio may be noises related to the activity shown visually on the display. In some embodiments, an auditory signal may be added to the video. Such a signal may be during the actual calibration of a position and may make use of operant conditioning, i.e. the audio may work to implicitly train the participant to stay focused during the calibration event. Methods for achieving operant conditioning will be known to those skilled in the art. By using audio and video, the user's attention may be better retained.

The method may further comprise repeating steps (a) to (c) for calibration points where it is determined that previously captured calibration data is not sufficient.

Repetition of calibration points may improve the overall calibration process by removing erroneous calibration data and replacing it with accurate calibration data.

An operator may determine that the calibration data is inaccurate not sufficient. Oversight by an operator can make sure that the calibration data is good enough for future eye tracking procedures. For example, if an operator notices that the calibration data for a particular calibration point is inaccurate or is not sufficient, they may manually trigger calibration data for that calibration point to be recollected.

Additionally or alternatively, an automated process may determine that the calibration data is inaccurate or not sufficient. The automated process may be executed by the processor of the system or by an external, optionally remote, processor.

The method may further comprise monitoring the calibration process of a separate display, to review calibration data during the calibration process.

According to a second aspect, there is provided an eye tracking system, comprising:
  a display, viewable by a user;
  an eye tracking device, comprising an image sensor configured to track a gaze of the user on the display; and
  a processor, configured to present a video on the display to the user, having a start size and a start position, and further to sequentially cause, for at least one calibration position, the steps of:
    (a) resizing the video to a second size, wherein the second size is smaller than the first size, and translate the video to a calibration position;
    (b) recording calibration data, using the eye tracking device, for the user viewing the video in the calibration position;
    (c) resizing the video to a second size that is greater than the start size.

The processor may be configured to repeat steps (a) to (c) for a plurality of calibration positions.

The use of multiple calibration positions ensures that the calibration process provides good accuracy over a whole of the display.

The second size may be the same as the start size.

The processor may further be configured to, in step (c), translate the video away from the calibration position. The translation may be in the direction of the start position. Optionally, the translation may be back to the start position.

For example, the start size of the video may fill 100% of the display, or may fill more than 90% of the display, or may fill more than 80% of the display. Any area of the display not filled with the video may be empty of anything that would provide a distraction to the user.

The start size may be a size that fills or substantially fills the display.

The start position may be central on the display.

Resizing and translation of the video may be performed simultaneously. By resizing and translating the video simultaneously, the attention of the user may be better retained on the video during the calibration process.

Alternatively, resizing may follow translation or translation may follow resizing.

The video may continue seamlessly throughout calibration. By continuing the video seamlessly throughout the entire calibration process, the attention of the user may be better retained. Changing the content of the video part way through the calibration process may risk losing the attention of the user.

Alternatively, the video may be changed part-way through the calibration process. Although this may interrupt the ongoing attention of the user, utilising new content in the video may renew the user's interest in the video and therefore may assist with calibration of multiple calibration points. In this case, it may still be desirable to provide a consistent stream of video content for each calibration point.

It may be desirable to avoid changing the content of the video whilst the video has the attention of the user. Therefore, changing of the video may only occur when it has been determined, automatically or manually, that the attention of the user is not on the video.

The content of the video may be forced to change if it is determined that the attention of the user has been lost. By changing the content, attention of the user may be re-captured. Detection of attention loss may be by detecting the general gaze direction of the user, e.g. by detecting that they have turned their head away from the display or are clearly looking to the side of the display, and may be automatic or determined by an operator of the system.

The video may be accompanied by audio content. The audio content may be correlated to the video, e.g. the audio may be noises related to the activity shown visually on the display. By using audio and video, the user's attention may be better retained.

The processor may be configured to repeat steps (a) to (c) for calibration positions where it is determined that previously captured calibration data is inaccurate or not sufficient.

Repetition of calibration points may improve the overall calibration process by removing erroneous calibration data and replacing it with accurate calibration data.

An operator may determine that the calibration data is inaccurate or not sufficient. Oversight by an operator can make sure that the calibration data is good enough for future eye tracking procedures. For example, if an operator notices that the calibration data for a particular calibration point is inaccurate or is not sufficient, they may manually trigger calibration data for that calibration point to be recollected.

An automated process may determine that the calibration data is inaccurate or not sufficient. The automated process may be executed by the processor of the system or by an external, optionally remote, processor.

The eye tracking system may further comprise a separate display for reviewing calibration data during the calibration process.

BRIEF DESCRIPTION OF THE DRAWINGS

Specific embodiments will now be described in detail with reference to the accompanying drawings, in which:

FIGS. 3a to 3h are visual representations of the method of calibration of the first aspect;

DETAILED DESCRIPTION

Figure 1:
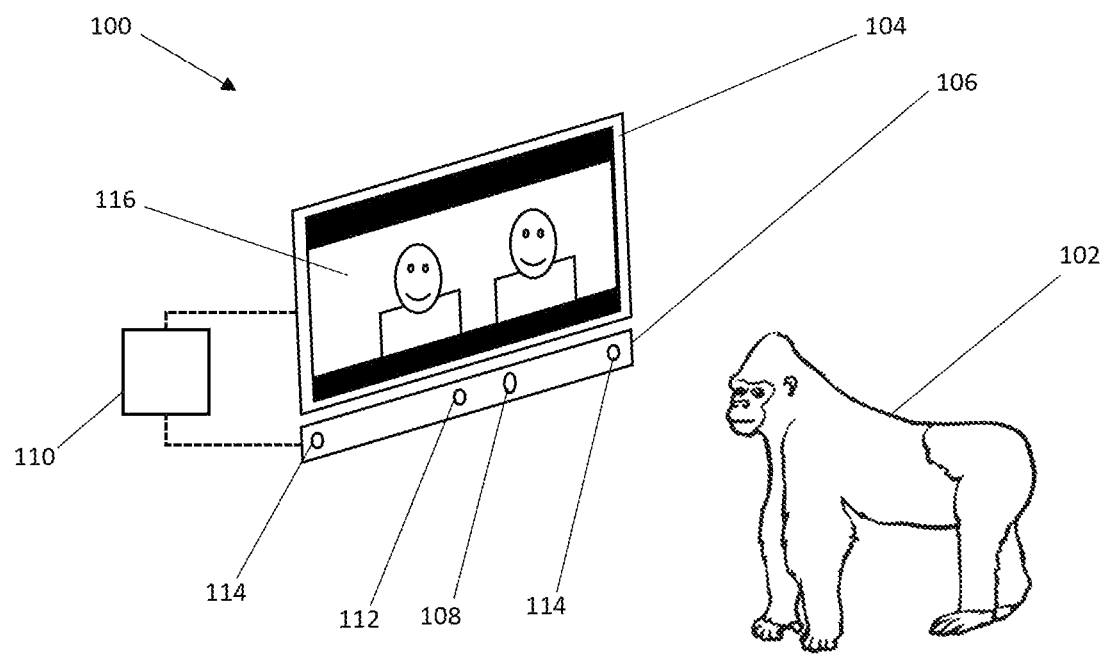
FIG. 1 is a representative view of a user using an embodiment of the eye tracking system of the second aspect.

Referring firstly to FIG. 1, there is depicted an eye tracking system 100. The eye tracking system 100 is usable to track the gaze of a user 102, here a non-human primate, relative to a display 104. By tracking the gaze of the user 102 relative to the display 104, it can be determined where the user 102 is directing their attention when looking at the display 104. This can be useful for many circumstances, including as a control input for a computer, for research purposes, or for diagnosis of medical conditions, for example.

The eye tracking system 100 comprises a display 104, on which an image can be presented to the user 102, and an eye tracking device 106 comprising an image sensor 108 that is directed towards the user 102. A processor 110 interlinks the eye tracking device 106 and the display 104, enabling the processor 110 to communicate with the eye tracking device 106 and to send commands to the display and thus allowing correlation to be made between the image shown on the display 104 and the image captured by the eye tracking device 106. By imaging the eyes, and optionally also the head position of the user 102, the eye tracking system 100 can determine the gaze direction of the user 102. This is a well-known process and will not be described in more detail here.

In the depicted system, the display 104 is paired with an eye tracking device 106 comprising the image sensor 108 and three illuminators 112,114. One illuminator 112 is positioned close to the image sensor 108 and can therefore be used to provide a bright pupil, or BP, image. The other two illuminators 114 are positioned away from the image sensor 108 and can be used to provide a dark pupil, or DP, image. The use of BP and DP images in eye tracking are well-known and will not be described further. The eye tracking device 106 may be, for example, a Tobii Eye Tracker S or a Tobii Pro Fusion, as produced by Tobii AB of Danderyd, Sweden. Depending on the particular eye tracking device used, there may be different numbers and positions of illuminators and image sensors. The depicted embodiment is just a non-limiting example of these and the full spectrum of arrangements will be known to the skilled person.

In order to provide good accuracy for eye tracking of a user, the eye tracking system 100 must be calibrated. The eye tracking process increases accuracy by correlating a direction of gaze detected by the eye tracking device 106 with an image viewable at a specific point on the display 104, known as a calibration point or calibration position. Calibration data can be collected that correlates the gaze direction with each calibration position. In general, the more calibration positions that are used during the calibration process, the better the eye tracking system 100 can be calibrated for a specific user 102. Once calibrated, the eye tracking device 106 can be used as normal.

Figure 2:
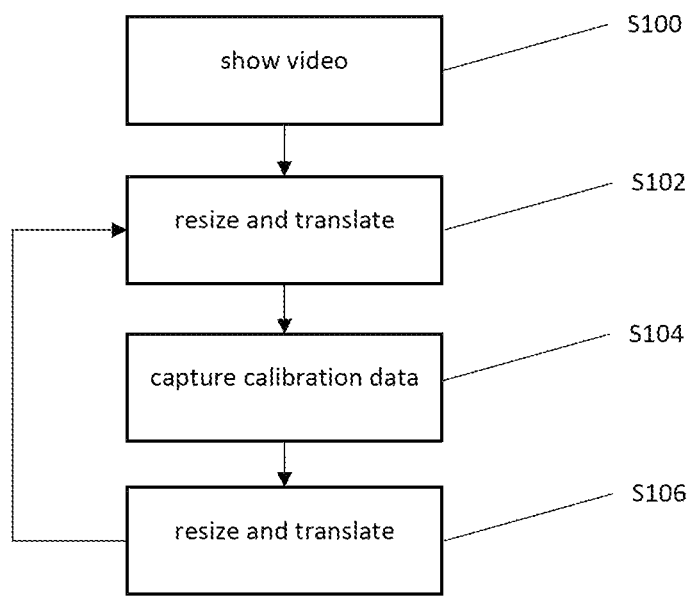
FIG. 2 is a flow chart of an embodiment of the method of calibration the first aspect.

The present calibration process is designed to ease calibration for all users, no matter whether they are capable of correctly understanding or responding to instructions of an operator of the eye tracking system. The calibration process is described with reference to the eye tracking system 100 of FIG. 1 and the flow-chart of FIG. 2. FIGS. 3a to 3h show how the image presented on the display 104 changes over the course of the calibration process.

In a first step, a video 116 is shown on the display. As in FIG. 3a, the video 116 takes up a large proportion of the display 104. Preferably, this large proportion is the majority of the display 104. By using a video 116 rather than a still image, the attention of the user 102 may be drawn to and may remain drawn to the display 104 over a prolonged period of time. Any type of video 116 may be shown on the display 104 but it may be desirable to tailor the content of the video 116 to the particular user. For example, a cartoon may be shown to small children, or a video of food or animals of the same or a different species may be used with non-human primates such as apes or chimpanzees. Where the content of a video is to be used for further study using the eye tracking device, it may be desirable to calibrate the device using a video with different content to that of the study.

The video 116 is shown S100 before any sort of calibration data is captured and is there to capture the attention of the user 102. Once the user's attention has been successfully captured, the rest of the rest of the calibration process may begin.

Figure 3B:
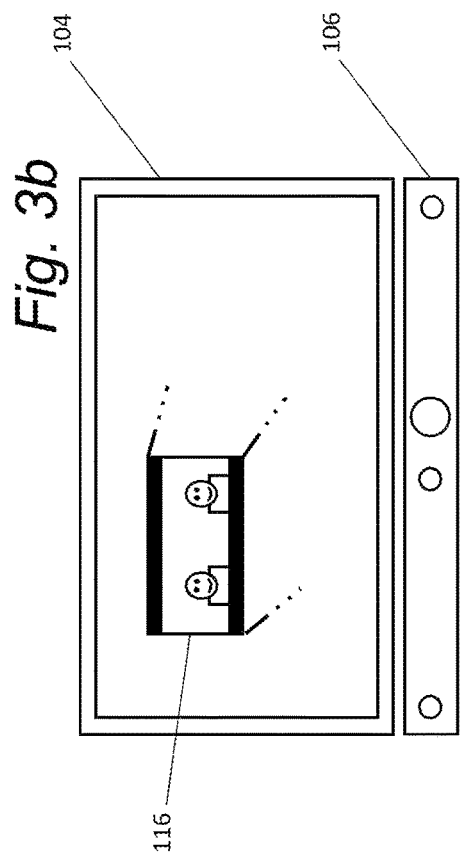
Figure 3A:
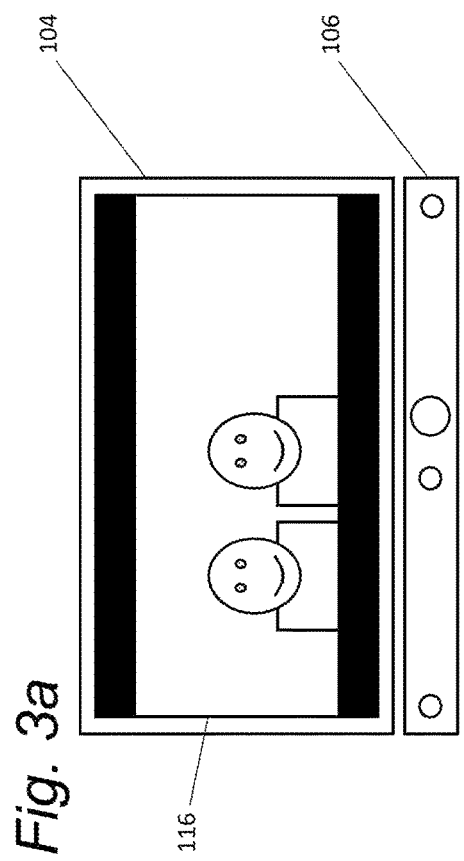

After initiation of the next stage of the process, the video 116 begins to resize and translate S102 on the display 104. This allows the attention of the user 102, and thus their direction of gaze, to be drawn to a desired position of the display 104. Importantly, the video 116 shown on the display 104 does not change between its action in grabbing the attention of the user 102 and its action in calibration, i.e. the video content continues to play. Thus, the user 102 need not be aware that calibration is being carried out. As shown in FIGS. 3b and 3c, the video 116 shrinks as it moves to the top left corner of the display, where it reaches its minimal size and ceases movement. The position at which the video 116 ceases movement is known as a calibration point or calibration position, and this is predetermined by the system or pre-programmed by an operator, as is well-known in the art. It is beneficial for the resizing and translation of the video 116 to be simultaneous, such that the gaze of the user 102 is drawn fluidly with the transformation of the video 116. At the point at which the video 116 is stationary and at its smallest size, the eye tracking device 106 captures calibration data S104 to correlate the position of the gaze of the user 102 with the calibration position.

Because the video 116 is of a small size, it can be assured that the attention of the user 102 on the video 116 is centred on a small section of the display 104. Thus, the calibration of the display 104 can be provided in the knowledge that the user 102 must be gazing at that small section. In addition, because the video 116 continues to play, the attention of the user 102 continues to be attracted by the video 116, in stark contrast to the use of a static image, as used in previously known calibration techniques.

The actual size of the video when it is at its smallest can be adjusted depending on the accuracy required by the calibration process. The accuracy of the calibration will be proportional to the size of the stimulus, i.e. the video, that the user is viewing. Therefore, the video can be sized according to the accuracy that is required for the study. For example, if for the remainder of the eye tracking study it is only important to detect if the user is looking at the screen or to the left or the right of the screen, the video may be larger in its small size than for a study that requires greater accuracy of the user's gaze.

Figure 3D:
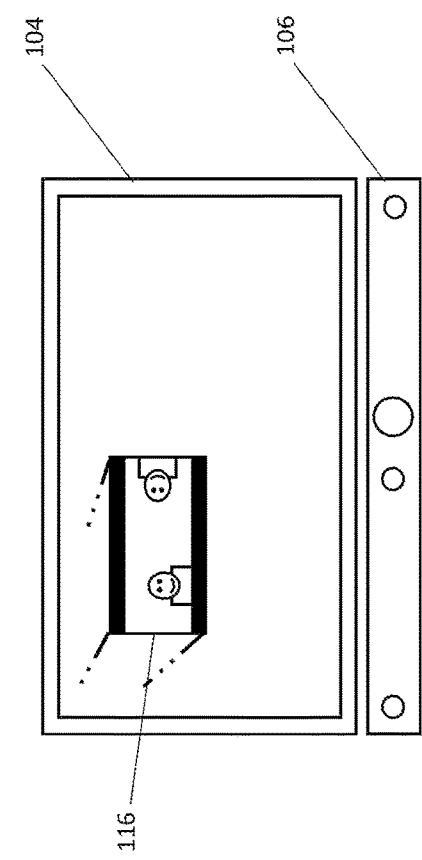
Figure 3C:
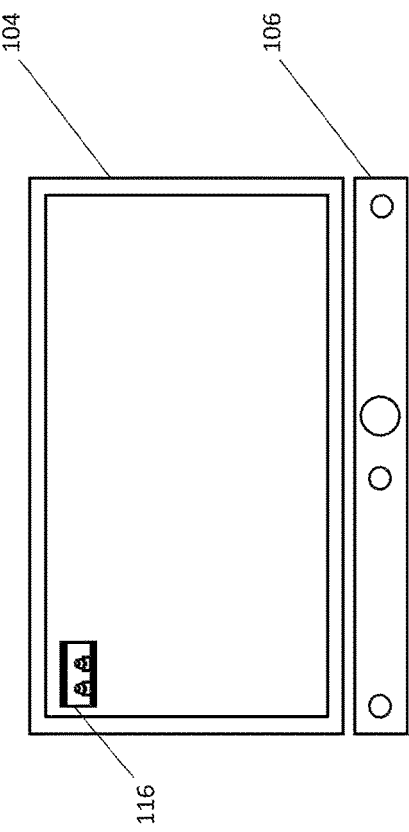

Once calibration data is collected, the video 116 returns to its original size and position S106, as shown in FIG. 3d. By returning to the original position, the attention of the user 102 may be better retained on the video 116 than if the video 116 were to move straight to a second calibration position at another position on the display 104.

In other embodiments, it may be that the video does not return to the exact size and position that it was previously. For example, the video may enlarge and translate but only to an intermediate size which is larger than when the video is being used to gather calibration data but is smaller than the original size. Similarly, the translation of the video may be away from the calibration position but not all the way back to the original position, or may be in a direction towards a subsequent calibration position without returning first of all to the original position. However, the larger the video is, the more likely it is that the video will retain the attention of the user.

The sequence of events—resizing and translation S102, data gathering S104, resizing and translation S106—can then be repeated for any further calibration positions of a calibration sequence. FIGS. 3e to 3h show the sequence for calibration with a further calibration position located in the top right corner of the display 104. Commonly, calibration sequences may comprise 1, 4, 6, or 9 calibration positions, and these may be spread evenly across the display, to provide a good coverage for the calibration. Such calibration sequences are well-known in the art. Calibration sequences having different numbers of calibration positions may also be provided.

As the video 116 continues throughout the calibration process, the attention of the user 102 remains drawn to the video 116, which maximises the chances of the calibration being accurate enough for a successful calibration. In other embodiments, the video content being displayed may change between calibration positions. It is most important that the video 116 retain the attention of the user during the shrink-and-calibrate parts of the process. After the calibration data has been gathered for a calibration position, it is less important that the video retain user attention, at least until the video begins to shrink to the next calibration position. Therefore, if it is necessary to change the video content at any time, it may be done whilst the video is growing immediately after the gathering of calibration data.

In some embodiments, it may be desirable to change the content of the video if it is detected that the attention of the user has been lost. In this case, the change of the video may be advantageous in order to re-capture user attention. In this case, it may be desirable to change the content whilst the video is being shown in full size.

Figure 4:
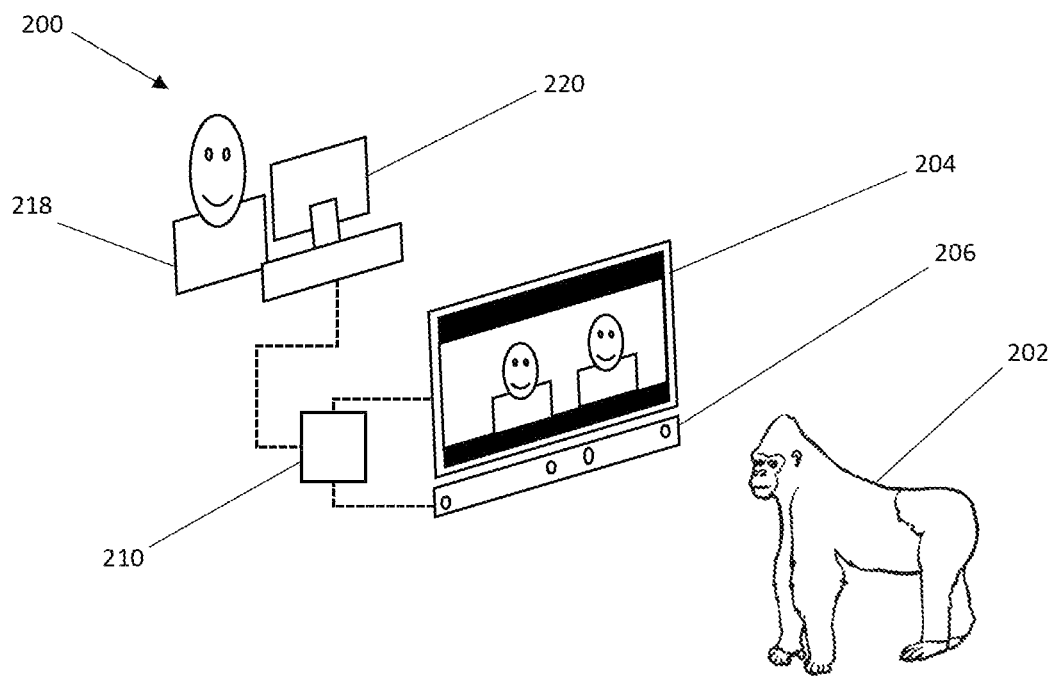
FIG. 4 is a representative view of a user using another embodiment of the eye tracking system of the second aspect.

In some embodiments, it may be desirable to have operator oversight of the calibration process. For example, after each calibration position, or at the end of a calibration sequence, the operator may review the calibration data in order to determine if it is good enough to provide an accurate calibration. The operator 218 may therefore use a computer workstation that is in communication with the rest of the eye tracking system 200, as shown in FIG. 4.

The operator 218 can monitor the calibration process during its operation. For example, if calibration data for a calibration position is considered to lack accuracy or to be poor in any other way, the operator 218 may cause this calibration position to be inserted back into the calibration sequence, either straight away or at a later point in the calibration process. Calibration data may be considered to be poor, for example, if there is high variability in the gaze position during the gathering of the data or if there is a substantial amount of data missing such as through the gaze tracking device being unable to track the gaze. Calibration data may also be considered poor if the application of the data to the calibration model, e.g. the eye model to which the calibration data is being applied, leads to a residual error after fitting the model. In each case, thresholds may be predetermined by the system or may be set by an operator in order to determine under what circumstances calibration data should be rejected or considered of poor quality. It may also be considered to be poor if there is evidence of user distraction. It is possible to detect such distraction by manual inspection of the calibration or validation results, for example in graphical form, or by reviewing the data with a trained algorithm. Methods of doing so will be known to those skilled in the art.

Of course, if the calibration data is considered to be good, the process can continue without any operator input. Because the operator 218 has a separate display 220 associated with their workstation, the monitoring and restructuring of the calibration process can be managed without interrupting the user 202, who can remain with their attention on the video 216 being shown. The advantage of this arrangement is therefore that the calibration process can continue without the knowledge or specific cooperation of the user 202.

Although this depicted embodiment uses the manual input of an operator 218 to control any re-insertion of calibration positions into a calibration sequence, this step may also be completed automatically by the processor 210 interconnecting the display 204 and eye tracking device 206 or a separate or remote processor. Automatically reviewing the calibration data ensures that the calibration process continues until such a time as the calibration data is considered to be accurate and trustable for ongoing eye tracking processes.

Figure 5:
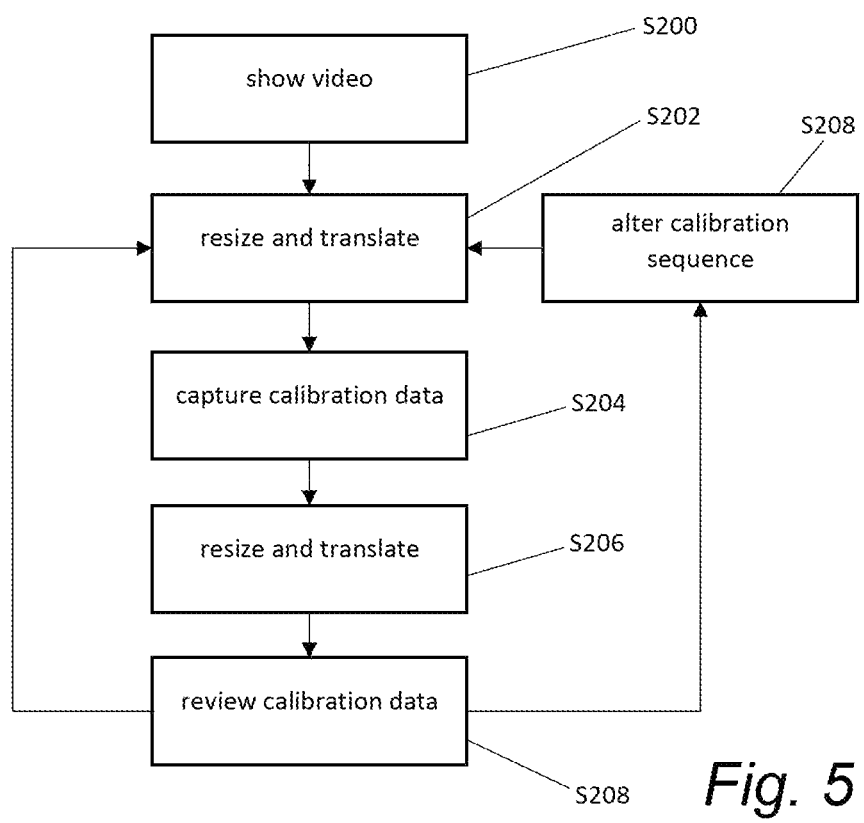
FIG. 5 is a flow chart of another embodiment of the method of calibration of the first aspect.

The step of reviewing S208 the calibration data is shown in FIG. 5, sequentially after the calibration data is gathered S206. If the data calibration is good, then gathering of data at the next calibration position can then be continued. Alternatively, if the calibration is bad, for example by any measure discussed previously, then the calibration sequence may be altered S210 in order to re-do the calibration process for the same calibration position again or to add the poorly calibrated position to the calibration sequence. The remaining steps—those of showing the video S200, resizing and translating the video S202, capturing calibration data S204, and again resizing and translating the video S206—are the same as those of FIG. 2, and are given alike reference numerals.

Of course, the calibration data may also be reviewed in its entirety at the end of the calibration sequence and any poor calibration data may lead to the re-running of the entire calibration sequence or a subset of calibration positions.

Where an operator 218 is present, they may also initiate the calibration process once it is deemed that the user's attention has been captured by the video being shown on the display 204. For example, the operator 218 may be able to view the feed from the image sensor 208 in order to check whether or not the user appears to be viewing the video, or whether the user's attention is directed elsewhere. In other embodiments, the image sensor 208 may be configured to detect if the user 202 appears to be looking at the video and to initiate the calibration process once it is determined that they are.

Although the present invention has been described with reference to a display and eye tracking device that are remote from the user, the invention is not limited to such arrangements. The invention is suitable for any application where calibration of a user respective to a display is required. For example, the invention is also suitable for head-mounted displays, such as in virtual reality or mixed reality headsets.

Whilst the present invention has been discussed in relation to humans and non-human primates, the method and system disclosed may also be applied to other animals, where it is desirable to track said animal's eyes. For example, dog cognition may be of interest and the presently disclosed method and system are equally applicable to use on dogs as they are to use on humans and primates. Similarly, the present method and system could be applied to robots such as human robots, in the event that their visual system is designed in a way that moving shapes and colours enact the capture of attention in the same or a similar way as in the human visual system.

The invention claimed is:

1. A method for calibrating an eye tracking device configured to track a gaze point of a user on a display, the method comprising:
   presenting a start video on the display to a user, the video having a start size, whereby the video occupies substantially the entire display, and a start position;
   tracking the gaze of the user, using an image sensor of the eye tracking device;
   resizing and translating a video simultaneously so as to draw the user's gaze fluidly to at least one calibration position;
   retaining the user's gaze by seamlessly switching between video display to a calibration process; and
   sequentially completing, for at least one calibration position, the steps of:
   (a) resizing the entirety of the video to a calibration size, wherein the calibration size is smaller than the start size, and translating the video to a calibration position, while filling the remaining area of the display with a background color different from the edge color of the start video;
   (b) recording calibration data, using the eye tracking device, for the user viewing the video in the calibration position;
   (c) resizing the video to a second size that is greater than the calibration size.

2. The method of claim 1, wherein the method of calibration comprises a plurality of calibration positions, and steps (a) to (c) are repeated for each calibration position.

3. The method of claim 1, wherein the second size is the same as the start size.

4. The method of claim 1, wherein the start size is a size that fills or substantially fills the display.

5. The method of claim 1, further comprising, in step (c), translating the video away from the calibration position.

6. The method of claim 5, wherein the translation is in the direction of the start position, and is optionally back to the start position.

7. The method of claim 1, further comprising repeating steps (a) to (c) for calibration positions where it is determined that previously captured calibration data is inaccurate or not sufficient.

8. The method of claim 1, further comprising monitoring the calibration process on a separate display, to review calibration data during the calibration process.

9. An eye tracking system, comprising:
   a display, viewable by a user;
   an eye tracking device, comprising an image sensor configured to track a gaze of the user on the display; and
   a processor, configured to:
   present a start video on the display to a user, the video having a start size, whereby the video occupies substantially the entire display, and a start position;
   resize and translate the video simultaneously so as to draw the user's gaze fluidly to at least one calibration position;
   retain the user's gaze by seamlessly switching between video display to calibration process; and
   sequentially cause, for at least one calibration position, the steps of:
   (a) resizing the entirety of the video to a calibration size, wherein the calibration size is smaller than the start size, and translate the video to a calibration position, while filling the remaining area of the display with a background color different from the edge color of the start video;
   (b) recording calibration data, using the eye tracking device, for the user viewing the video in the calibration position;
   (c) resizing the video to a second size that is greater than the calibration size.

10. The eye tracking system of claim 9, wherein the processor is configured to repeat steps (a) to (c) for a plurality of calibration positions.

11. The eye tracking system of claim 9, wherein the second size is the same as the start size.

12. The eye tracking system of claim 9, wherein the start size is a size that fills or substantially fills the display.

13. The eye tracking system of claim 9, wherein the processor is further configured to cause, in step (c), translating of the video away from the calibration position.

14. The eye tracking system of claim 13, wherein the translation is in the direction of the start position, and is optionally back to the start position.

15. The eye tracking system of claim 9, wherein the processor is configured to repeat steps (a) to (c) for calibration positions where it is determined that previously captured calibration data is inaccurate or not sufficient.

16. The eye tracking system of claim 9, further comprising a separate display for reviewing calibration data during the calibration process.

\* \* \* \* \*